(12) United States Patent
Dickey

(10) Patent No.: US 8,975,775 B2
(45) Date of Patent: Mar. 10, 2015

(54) FAIL PROTECTED PULSE GENERATOR AND SYSTEM

(75) Inventor: John A. Dickey, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 636 days.

(21) Appl. No.: 13/357,176

(22) Filed: Jan. 24, 2012

(65) Prior Publication Data
US 2013/0187452 A1    Jul. 25, 2013

(51) Int. Cl.
*H02J 1/00* (2006.01)

(52) U.S. Cl.
CPC .................................. *H02J 1/00* (2013.01)
USPC ................... 307/18; 361/18; 361/65; 361/88

(58) Field of Classification Search
CPC .......................................................... H02J 1/00
USPC .................................. 307/18; 361/18, 65, 88
See application file for complete search history.

Primary Examiner — Hal Kaplan
(74) Attorney, Agent, or Firm — Cantor Colburn LLP

(57) ABSTRACT

A power distribution system comprises a power supply, a plurality of loads connected to one of the power supply and ground and a plurality of pulse generators, each pulse generator connected to each of the plurality of loads, configured to generate pulses to connect the plurality of loads to the other one of the power supply and ground at predetermined frequencies.

20 Claims, 3 Drawing Sheets

FAIL PROTECTED PULSE GENERATOR AND SYSTEM

BACKGROUND OF THE INVENTION

Exemplary embodiments pertain to the art of power distribution devices and systems. In particular, exemplary embodiments pertain to power distribution devices and systems that provide protection from circuit failure.

In power distribution systems, power from one or more power supplies is distributed from a power supply line to a plurality of loads which may have varying operating voltages. Conventional power distribution systems may include separate circuit failure devices for each load to allow the system to continue operating when any one load fails.

BRIEF DESCRIPTION OF THE INVENTION

Disclosed is a power distribution system comprising a power supply, a plurality of loads connected to one of the power supply and ground, and a plurality of pulse generators, each pulse generator connected to each of the plurality of loads, configured to generate pulses to connect the plurality of loads to the other of the power supply and ground at predetermined frequencies.

Also disclosed is a failure detection circuit comprising a plurality of pulse generators connected to a same pulse line and to ground, each pulse line configured to be connected to a plurality of loads, wherein each of the plurality of pulse generators comprises a first transistor to connect the pulse line to ground and a second transistor connected in series with the first transistor, source-to-drain, configured to detect a fault voltage at an output of the first transistor and to isolate the first transistor from ground when the fault voltage is detected.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
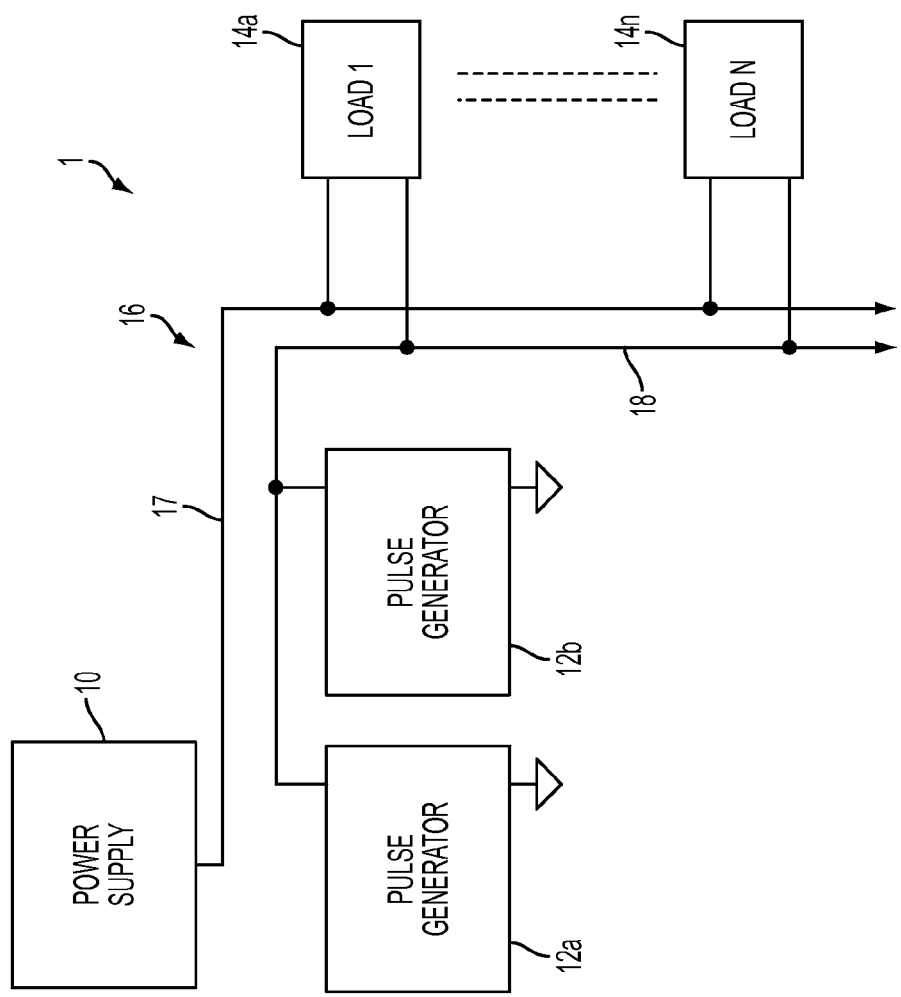
FIG. 1 is a diagram of a power distribution system according to one embodiment of the present invention.

FIG. 1 illustrates a power distribution system 1 according to an embodiment of the present invention. The power distribution system 1 includes a power supply 10 to supply power to a plurality of loads 14 (load 1 ... load N). One or more of the plurality of loads 14 may have a different operating voltage than another of the plurality of loads 14. The power supply 10 may include a plurality of power supplies. The power supply 10 supplies DC power to the plurality of loads 14 via the distribution bus 16. In particular, the plurality of loads 14 is connected to the power supply 10 via a DC feed line 17 and may be connected to ground via a pulse line 18 connected to a plurality of pulse generators 12.

In particular, the pulse generators 12 are fail passive pulse generators. Each pulse generator 12 connects the pulse line 18 to ground in pulsed intervals. In one embodiment, each pulse generator 12 operates at a 10% to 25% duty cycle, thereby ensuring both on and off states of the distribution bus 16. The pulse generators 12 may operate asynchronously with respect to each other. In other words, although the fail passive pulse generators 12 operate asynchronously with respect to each other, the 10% to 25% duty cycle ensures that whether the pulses overlap or not in time, both on and off states of the distribution bus 16 are achieved with adequate off time remaining for the coupling transformers flux to restore back to zero.

The pulses generated by the pulse generators 12 sometimes overlap and sometimes are separate, resulting in varying pulse widths on the pulse line 18. While FIG. 1 illustrates two pulse generators 12a and 12b, any number of pulse generators 12 may be connected to the pulse line 18, according to the desired redundancy of the system 1.

In one embodiment, the number of fail passive pulse generators 12 is less than the number of loads 14. For example, in one embodiment, the DC feed line 17 is connected to between 7 and 17 loads 14, and the number of fail passive pulse generators 12 is less than 7. In one embodiment, the number of pulse generators 12 is two. In other embodiments, the number of pulse generators 12 is greater than two. Each of the pulse generators 12 is connected to each of the loads 14. In the event that a short is detected at one of the pulse generators 12, the first FET N1 is turned off to isolate that pulse generator from the distribution bus 16 so that the pulse to ground of the pulse line 18 is still carried out by the redundant pulse generators 12. Since the amplitude of the DC feed line 17 is maintained, the plurality of loads 14 receive substantially the same voltage input, even when one or more of the pulse generators 12 is disabled. In addition, a feedback circuit may be provided to the pulse generators 12 to maintain a voltage level to the loads 14, even when one or more of the pulse generators 12 fails or is disabled.

Although FIG. 1 illustrates the loads 14a-14n connected to a power supply 10 and connected to ground via the pulse generators 12a and 12b, according to alternative embodiments, the loads 14a-14n may be connected to ground and may be connected to power via the pulse generators 12a and 12b. In other words, the power and ground connections of FIG. 1 may be reversed.

Figure 2:
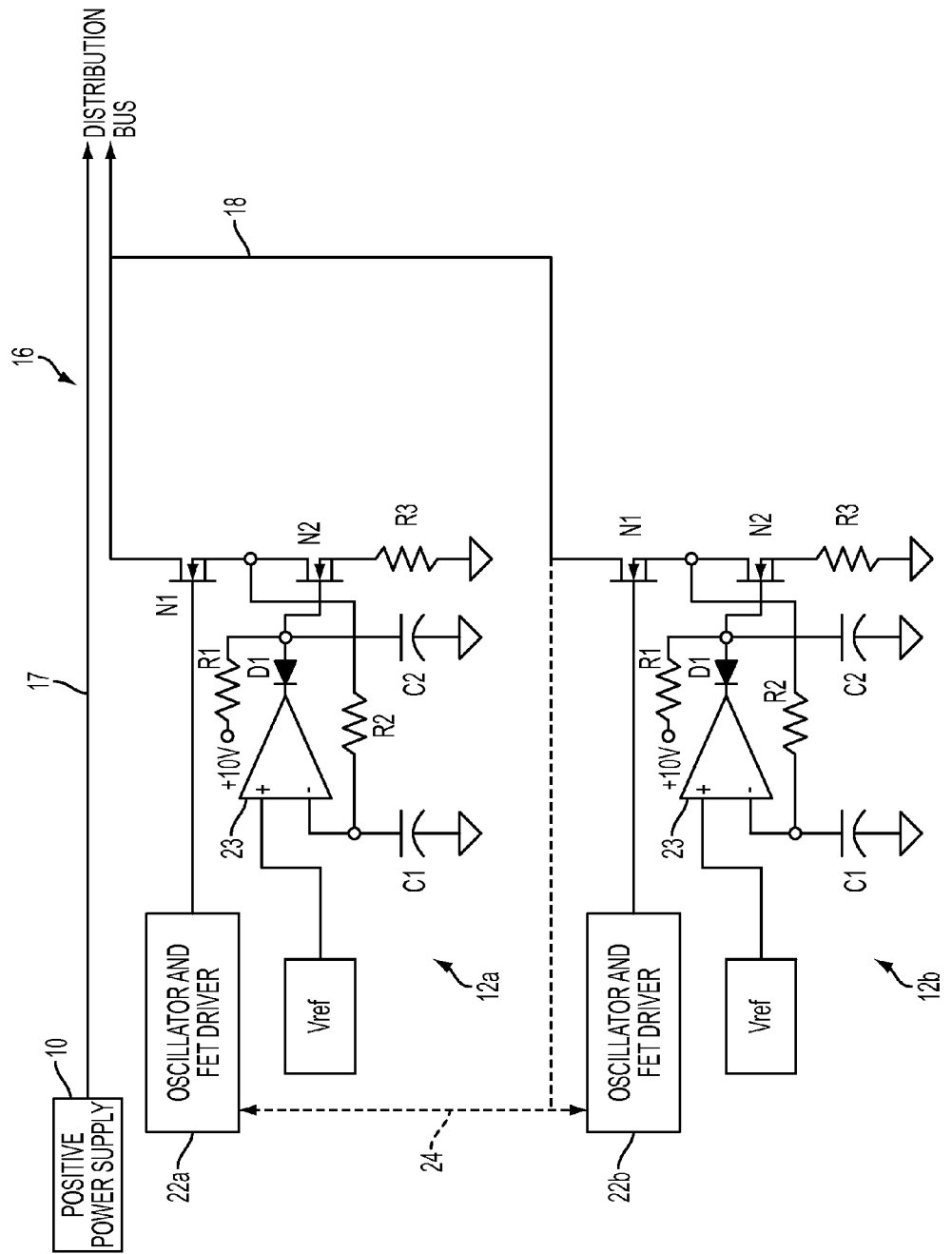
FIG. 2 is a diagram of a redundant pulse generation circuit according to an embodiment of the present invention.

FIG. 2 illustrates examples of a fault prevention circuit 1 including a plurality of pulse generators 12 according to an embodiment of the present invention. Each pulse generator 12 includes at least two transistors connected in series, source-to-drain, between the pulse line 18 and ground. In one embodiment, the two transistors are field effect transistors (FETs), such as metal oxide semiconductor FETs (MOSFETs) N1 and N2. As illustrated, a first FET N1 is connected at its gate to an oscillator and FET driver 22a and 22b. In some embodiments, the first FET N1 may be connected directly to an oscillator without an FET driver, and throughout the specification and claims, the reference numeral 22 will be used to refer to the oscillator 22. However, it is understood that an FET driver may also be included in a circuit with the oscillator 22a to drive the first FET N1.

The oscillators 22a and 22b turn on and off the first FET N1 of the respective pulse generators 12a and 12b to connect the pulse line 18 to ground at predetermined intervals. For example, in one embodiment, the oscillators 22a and 22b control the first FET N1 of the respective pulse generators 12a and 12b to have a duty cycle between 10% and 25%. In one embodiment, the gate of the first FET N1 is also connected to a FET driver. For example, the oscillator and FET driver may be part of the same circuit or device, or part of the same integrated circuit (IC), or the oscillator and FET driver may comprise separate circuits electrically connected to each other.

In an embodiment in which two pulse generators 12a and 12b are connected to the pulse line 18, an output frequency on the pulse line 18 is greater than a frequency of each oscillator 22a and 22b individually, and may vary according to whether the pulses overlap or whether the pulses do not overlap. Since the oscillators 22a and 22b are asynchronous, the oscillators 22a and 22b, and the pulse generators 12, respectively, will at times generate pulses that overlap and at times generate pulses that do not overlap.

The second FET N2 is connected in series, source-to-drain, with the first FET N1. The gate of the second FET N2 is connected to a comparator 23, which compares the voltage output from the first FET N1 with a reference voltage Vref. The reference voltage Vref is a predetermined voltage designed to correspond to a short circuit at the first FET N1, or another fault voltage. When the comparator 23 detects a short circuit based on the output voltage from the first FET N1, the comparator 23 outputs a control signal to turn off the second FET N2, isolating the first FET N1 from ground. Consequently, any loads connected to the pulse line 18 are protected from a fault in the first FET N1, or from a fault in the oscillator 22. In other words, the second FET N2 is a protection FET that blocks current flow through the first FET N1 when a short circuit or a switching FET 'stuck ON' is detected. The second FET N2 turns off, opening the circuit through the pulse generator 12, and allowing the redundant pulse generator(s) 12 to continue to drive the loads 14 at the reduced duty cycle of the redundant oscillator(s) 22.

Since the fault prevention circuit includes a plurality of pulse generators 12 connected to the pulse line 18, the loads connected to the pulse line 18 continue to receive pulses from the remaining pulse generator(s) 12. Consequently, the loads 14 connected to the pulse line 18 continue to be connected to ground at intervals determined by the oscillator 22 connected to the redundant pulse generator(s) 12. When one pulse generator 12 is disabled, or in other words, when the second FET N2 is turned off to disconnect the first FET N1 from ground, the pulse line 18 may be driven by any remaining redundant pulse generator(s) 12.

A feedback line 24 may provide information about the voltage of the pulse line 18 to the oscillators 22. When one pulse generator 12 is disabled, one or more redundant pulse generators 12 may sense a change in a duty cycle and frequency on the pulse line 18, and may adjust an oscillation frequency of the redundant oscillator(s) 22 to maintain a duty cycle and/or frequency of the pulse line 18.

In one embodiment, the oscillator and FET driver 22 of one of the plurality of pulse generators 12 is different from the oscillator and FET driver 22 of another of the plurality of pulse generators 12. In other words, the different oscillators 22 may be configured to operate at different frequencies. For example, the different oscillators 22 may be asynchronous from each other, so that the pulse generators 12 are asynchronous. Since a DC voltage is supplied along the DC feed line 17 from the positive power supply 10, the pulse line 18 connects to ground at intervals determined by the pulse generators 12 to generate an AC voltage on the distribution bus 16 to supply different power levels to different loads 14 connected to the distribution bus 16.

In addition, the oscillators and FET drivers 22 of different pulse generators 12 may be built with dissimilar designs, including different materials or oscillation generation circuits, to prevent multiple failures common to one type of design.

Each pulse generator 12 may include additional circuitry, such as a diode D1 located between the comparator 23 and the second FET N2, resistors R1, R2, and R3, and capacitors C1 and C2, respectively. It is understood that additional or alternative circuitry and components may be included in the pulse generators 12 according to the design requirements of the pulse generator 12.

One or more of the comparator 23, FETs N1 and N2, and oscillator and FET driver 22 may be located in the same IC or on the same printed circuit board (PCB). In one embodiment, comparators 22, FETs N1 and N2, and oscillators and FET drivers 22 of multiple pulse generators 12 are located on the same IC or PCB. In addition, one or more diodes D1, resistors R1, R2, and R3, and capacitors C1 and C2 may be located in the same IC or on the same PCB as the comparator 23 and/or the FETs N1 and N2.

While one comparator 23 is shown in each pulse generator 12a and 12b of FIG. 2, according to some embodiments, additional comparators provide additional information, such as notifications of over-voltages, under-voltages, over-currents, and under-currents at the pulse line 18. For example, in one embodiment, there are two comparators that form a 'window' detection function on the average current through the first FET N1. A first comparator, corresponding to the comparator 23, detects too much current such as when the first FET N1 is shorted or the oscillator 22 is stuck in an ON state. The other comparator detects too little current, such as a current caused by an open FET N1 or an oscillator stuck in an OFF position. While the outputs of both comparators may be provided to a control circuit to notify a user of a need to repair the circuit, only the first FET N1 results in the second FET N2 opening to isolate the pulse generator 12 from the distribution bus 16.

Figure 3:
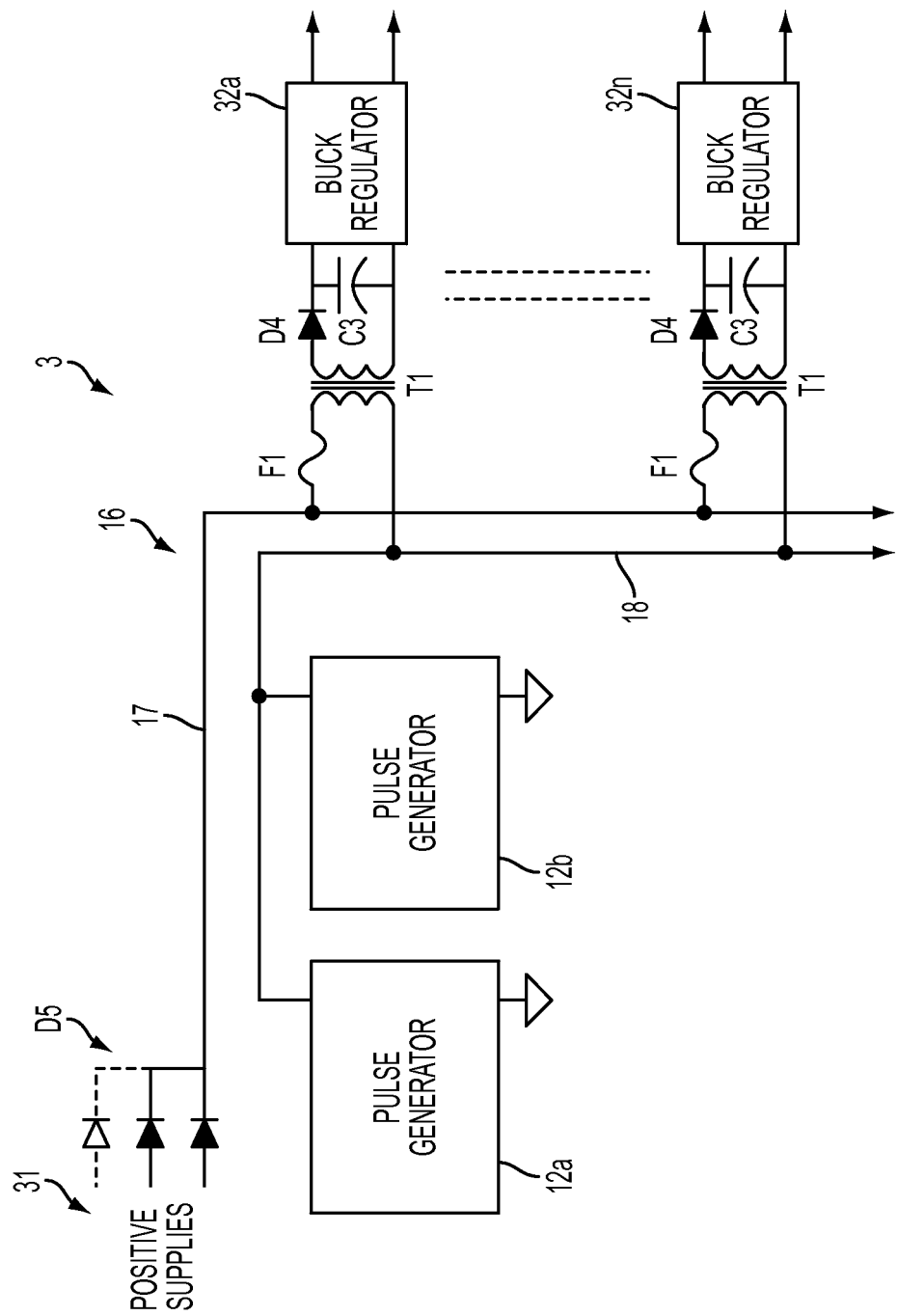
FIG. 3 is a diagram of a power distribution system according to an embodiment of the present invention.

FIG. 3 illustrates a power distribution system 3 according to an embodiment of the present invention. The power distribution system 3 may include a plurality of positive supplies 31 connected to the DC feed line 17. As illustrated in FIG. 3, the positive supplies 31 may be connected to the DC feed line 17 via a respective plurality of diodes D5 or other rectifiers. The plurality of positive supplies 31 may correspond to the power supply 10 of FIGS. 1 and 2. Each one of the plurality of positive supplies 31 may provide the same output voltage to the DC feed line 17, and may provide redundant power sources, in case one or more of the positive supplies 31 fails.

To convert the DC voltage of the DC feed line 17 to AC voltages corresponding to a plurality of loads, such as the loads 14, a plurality of transformers T1 and buck regulators 32 are provided. In one embodiment, each of the plurality of loads 14 operates at substantially the same voltage level. However, in alternative embodiments, different loads may operate at different voltage levels. A first end of the primary windings of each transformer T1 is connected to the DC feed line 17, and a second end of the primary windings of each transformer T1 is connected to the pulse line 18. The pulse line 18 periodically connects to ground based on the pulses of the pulse generators 12. The periodic pulses connecting the pulse line 18 to ground generate an AC signal across the primary windings of the transformers T1 to generate a respective AC signal across the secondary windings. The AC signal of the secondary windings may be regulated by a buck regulator 32, diode D4, and capacitor C3 to generate a DC voltage corresponding to an operating voltage of a respective load.

In one embodiment, one or more loads require a different operating voltage. Accordingly, one or more transformers T1 may generate a different AC voltage at the secondary windings, and a different DC voltage from the buck regulators 32.

A plurality of pulse generators 12 is connected to the pulse line 18. If one pulse generator 12 fails or stops generating a ground pulse, the additional pulse generators 12 continue to connect the pulse line 18 to ground at the predetermined frequency. For example, as discussed above with respect to FIG. 2, if a short circuit voltage is detected by one pulse generator 12 and the pulse generating components (such as the oscillator 22 and MOSFET N1) are isolated from ground, the remaining pulse generators 12 continue to provide pulses to ground to generate the AC signal in the system, which in turn allows the transformers T1 to generate different operating voltages for different loads.

A fuse F1 may be located between each transformer T1 and the distribution bus 16. For example, in FIG. 3, a fuse F1 is located between the DC feed line 17 and the transformer T1. In addition, a fuse may be located between each positive supply and the DC feed line 17 to disconnect one of the positive supplies 31 from the DC feed line 17 in the event of an over-current.

In the above-described embodiments, as few as two pulse generators provide a redundant fail passive distribution bus for multiple loads or control supplies. The number of loads or control supplies may be greater than two, so that a separate pulse generator is not required for each separate load or control supply. Additional pulse generators may be added (3 or more) for added redundancy and system availability. The above-described embodiments provide failure protection by detecting and isolating failures in oscillators or pulse generators.

A distribution system according to the above embodiments may have a reduced size relative to a system in which separate pulse generators are required for each load or control supply, since fewer parts are required to provide redundancy in a pulse generation circuit. In addition, a distribution system according to above-described embodiments may cost less than system in which separate pulse generators or separate redundant voltage regulators are provided for each load or control supply. In addition, the reduction in parts may reduce an overall failure rate of the distribution system.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the claims.

What is claimed is:

1. A power distribution system, comprising:
   a power supply;
   a plurality of loads connected to one of the power supply and ground; and
   a plurality of pulse generators, each pulse generator connected to each of the plurality of loads, configured to generate pulses to connect the plurality of loads to the other of the power supply and ground at predetermined frequencies.

2. The power distribution system of claim 1, further comprising a plurality of transformers, each transformer positioned between a respective one of the plurality of loads and the power supply, one terminal of the transformer connected to the power supply and an opposite terminal of the transformer connected to the plurality of pulse generators.

3. The power distribution system of claim 1, wherein at least two of the plurality of loads have different operating voltages from each other.

4. The power distribution system of claim 1, further comprising a feed line between the power supply and the plurality of loads to supply the power to the plurality of loads.

5. The power distribution system of claim 1, wherein the power supply is a DC power supply.

6. The power distribution system of claim 5, further comprising a plurality of transformers, each transformer positioned between a respective one of the plurality of loads and the power supply.

7. The power distribution system of claim 6, wherein at least two of the transformers are configured to transform a voltage output from the DC power supply to at least two different voltages corresponding to at least two different operating voltages of the plurality of loads.

8. The power distribution system of claim 1, wherein the power supply includes a plurality of DC power supplies.

9. The power distribution system of claim 1, wherein each of the plurality of DC power supplies is configured to supply power at a same voltage.

10. The power distribution system of claim 1, wherein each of the plurality of pulse generators includes a plurality of transistors connected in series, source-to-drain, and the power distribution system further comprises:
    an oscillator connected to a gate of a first transistor of the plurality of transistors; and
    a comparator connected to a gate of a second transistor of the plurality of transistors.

11. The power distribution system of claim 10, wherein the comparator is configured to isolate the first transistor when a fault voltage is detected at the first transistor.

12. The power distribution system of claim 11, wherein the comparator is configured to compare a voltage output from the first transistor with a predetermined reference voltage.

13. The power distribution system of claim 12, wherein the predetermined reference voltage is a voltage corresponding to a short circuit.

14. The power distribution system of claim 10, wherein each of the plurality of pulse generators is connected to a separate oscillator, and the separate oscillators are asynchronous.

15. The power distribution system of claim 14, wherein the separate oscillators are configured to activate the first transistor at a duty cycle between 10% and 25%.

16. The power distribution system of claim 10, further comprising a feedback circuit to provide the oscillator with feedback of at least one of a voltage and a frequency of the pulse line.

17. The power distribution system of claim 1, wherein a number of the pulse generators is less than a number of the loads.

18. A failure prevention circuit, comprising:
    a plurality of pulse generators connected to a pulse line and to ground, the pulse line configured to be connected to a plurality of loads,
    wherein each of the plurality of pulse generators comprises:
    a first transistor to connect the pulse line to ground; and
    a second transistor connected in series to the first transistor, source-to-drain, configured to detect a fault voltage at an output of the first transistor and to isolate the first transistor from ground when the fault voltage is detected.

19. The failure prevention circuit of claim 18, wherein each pulse generator comprises:
    an oscillator connected to a gate of the first transistor; and a comparator connected to a gate of the second transistor, configured to compare an output voltage of the first transistor to a predetermined fault voltage.

20. The failure prevention circuit of claim 18, wherein the plurality of pulse generators operate asynchronously with respect to each other.

* * * * *